INVENTOR.
Andrew J. Sorensen.
BY
W. L. Stout
HIS ATTORNEY

INVENTOR.
Andrew J. Sorensen.
BY
W. L. Stout
HIS ATTORNEY

Oct. 26, 1954

A. J. SORENSEN

IMPULSE CODE TRACK CIRCUIT APPARATUS FOR WAYSIDE AND CAB SIGNAL CONTROL 2,692,941

Filed Feb. 14, 1952

4 Sheets-Sheet 3

INVENTOR.
Andrew J. Sorensen.
BY
W. L. Stout
HIS ATTORNEY

INVENTOR.
Andrew J. Sorensen.
BY
W. L. Stout
HIS ATTORNEY

Patented Oct. 26, 1954 2,692,941

UNITED STATES PATENT OFFICE 2,692,941

IMPULSE CODE TRACK CIRCUIT APPARATUS FOR WAYSIDE AND CAB SIGNAL CONTROL

Andrew J. Sorensen, Edgewood, Pa., assignor to Westinghouse Air Brake Company, Wilmerding, Pa., a corporation of Pennsylvania Application February 14, 1952, Serial No. 271,611

19 Claims. (Cl. 246—34)

Figure 1:
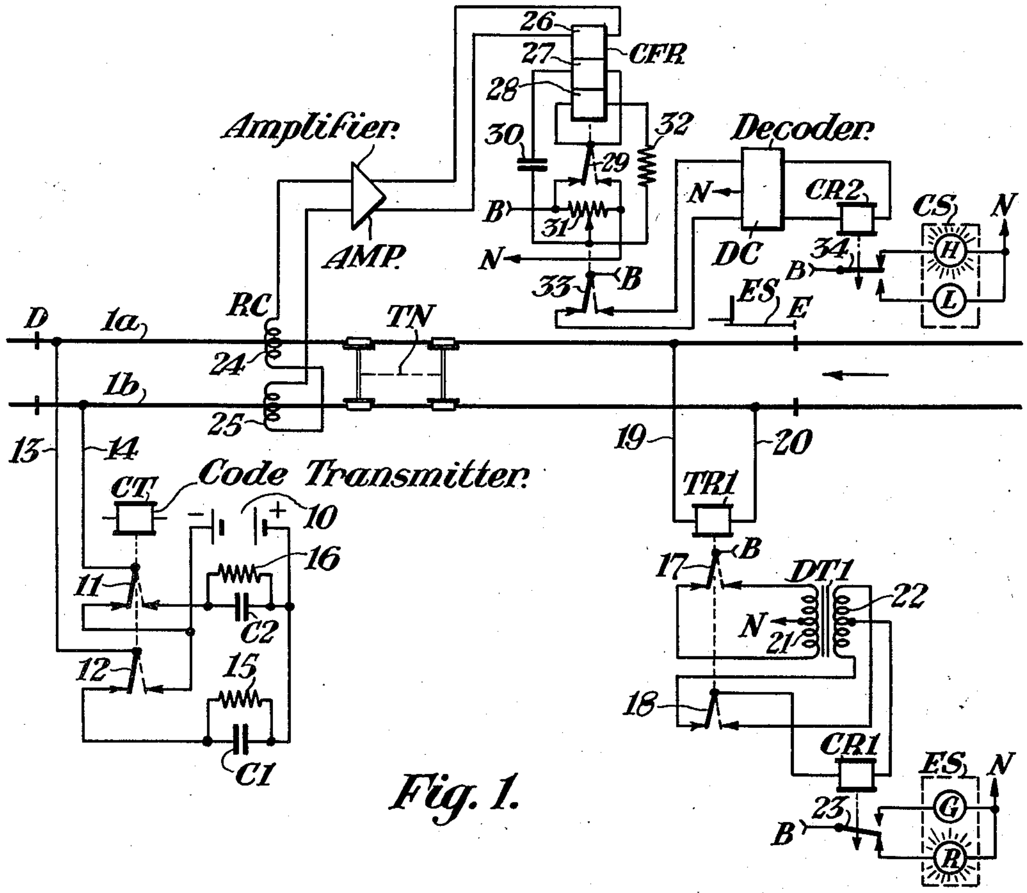

My invention relates to impulse code track circuit apparatus for wayside and cab signal control.

Track circuits using direct current impulses of relatively high voltage and of short duration have been proposed, these high voltage impulses increasing the shunting sensitivity of the track circuits due to the high peak voltage puncturing the resistance film between the track rails and the train wheels. Also, these high voltage impulses of direct current improve the control of inductive cab signals because their relatively high amperage increases the electromotive force inductively picked up by the train carried receiver. These direct current impulses can be coded readily by selecting the code rate at which the impulses are made to appear. For example, the code rates of 75, 120 and 180 impulses per minute to reflect different traffic conditions are used.

As far as I am aware, the former impulse code track circuit systems have produced the individual impulses by collapsing a magnetic field, a source of direct current being connected to a winding mounted on a magnetic core to build up a magnetic field in the core and then interrupting the current allowing the field to collapse to induce a voltage in the winding mounted on the core. The induced voltage impulse is applied to the track circuit. The circuit for supplying current for building up the magnetic field is closed and opened at a desired code rate thereby causing the induced voltage impulses to appear at a corresponding code rate.

In these former systems a relatively large amount of energy is dissipated in the winding during the building up of the magnetic field and these systems have an undesirable energy loss. Because of such energy loss, these systems require a relatively high capacity battery or direct current source and also a source having a relatively high voltage, that is, a voltage higher than the customary 1.8 to 2.0 volts so widely used in present day track circuits.

In view of the foregoing circumstances in track circuit apparatus using current impulses, an object of my invention is the provision of novel and improved impulse code track circuit apparatus for wayside and cab signal control.

Another object of my invention is the provision of improved impulse code track circuit apparatus wherewith impulses of a desired high voltage are obtained with a low loss of energy.

A further object of my invention is the provision of impulse code track circuit apparatus incorporating novel means for creating a relatively high voltage impulse from a single cell battery as a source of direct current.

A more specific feature of my invention is the provision of impulse code track circuit apparatus in which a capacitor is used as an energy storing device for providing track circuit current impulses.

Another feature of my invention is the provision of impulse code track circuit apparatus including novel and improved code responsive means which is effectively operated by current impulses of short duration.

Other features, objects and advantages of my invention will appear as the specification progresses.

The foregoing objects, features and advantages of my invention are attained by the provision of a circuit network wherewith a capacitor is connected alternately to a direct current source and to a discharge circuit at a desired code rate and thereby provide alternate charging current impulses and discharging current impulses with little loss of energy and either or both of which impulses can be used for energizing a track circuit, the track circuit being electrically coupled or connected to a selected one or both of the charging and discharging circuits. That is, in certain forms of the invention a unidirectional current source, such as a battery and a capacitor in series, are connected to the track circuit and a charging impulse of the capacitor provides an energizing impulse for the track circuit. In these forms of the apparatus, the capacitor is switched to a discharging circuit after each charging period so that the capacitor is fully discharged at the beginning of each charging period. In other forms of the invention the capacitor is charged and then connected or electrically coupled to the track circuit and the discharging impulse of the capacitor is used for energizing the track circuit. In still other forms of the invention, both the charging and the discharging current impulses of a capacitor are used for energizing the track circuit.

A pair of capacitors may be provided and in some forms of the invention a pair of capacitors are alternately switched between a source of unidirectional current, such as a battery, and the track circuit so that one capacitor is being charged while the other capacitor is being discharged, and vice versa. Preferably, the connections of a pair of capacitors are arranged in such a manner that the track circuit current has a polar code as well as a frequency code corresponding to the rate at which the impulses are made to appear. Again, the track circuit impulses may be all of the same polarity and only a frequency code provided for the track circuit. Furthermore, in some forms of the invention the circuit network is arranged in such a manner that a low voltage source of direct current, such as a single cell battery, is effective to provide a track circuit current impulse having a relatively high voltage, that is, a voltage higher than the voltage of the supplying battery. Furhermore, according to the invention, the associated code responsive means includes a code following relay, which is of such a construction that the so-called "contact bounce" is avoided.

I shall describe several forms of apparatus embodying the invention and shall then point out the novel feature thereof in claims.

Figure 2:
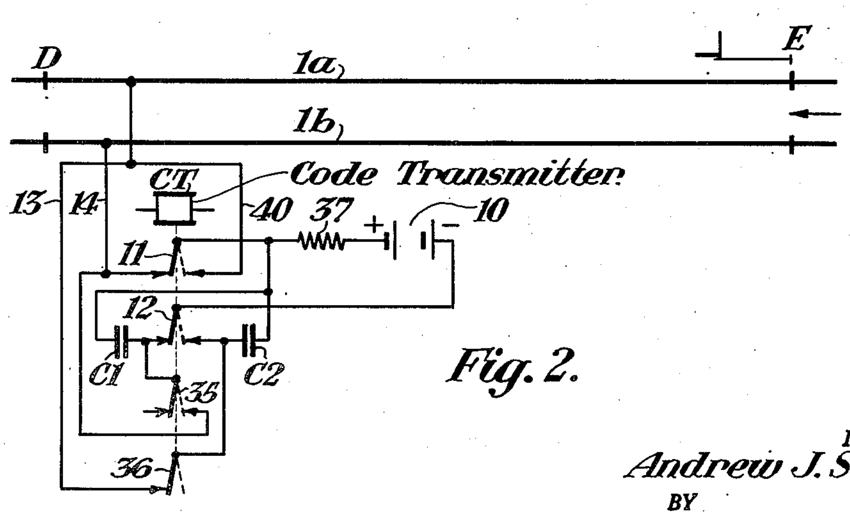
Figure 3:
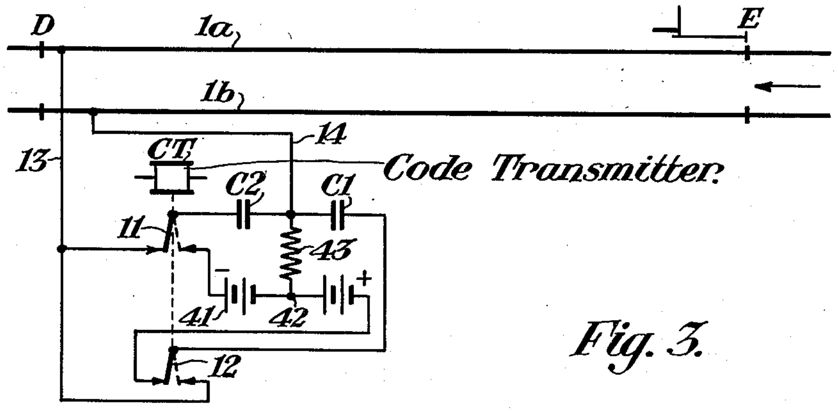
Figure 4:
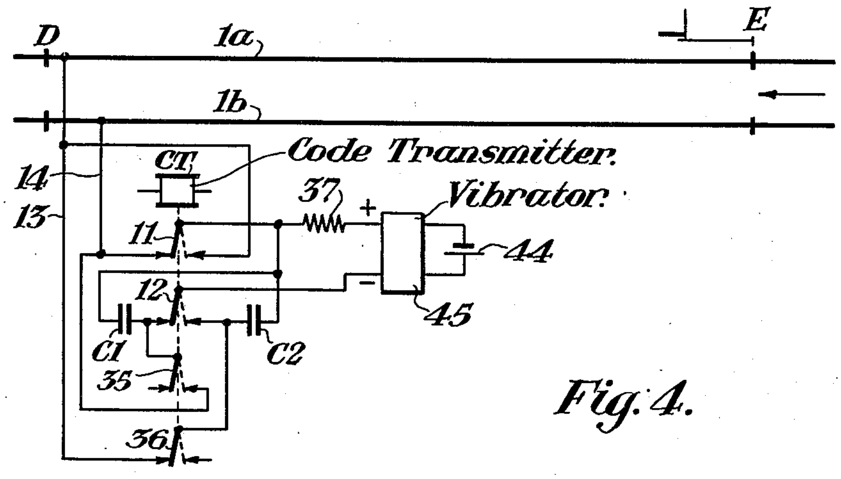
Figure 5:
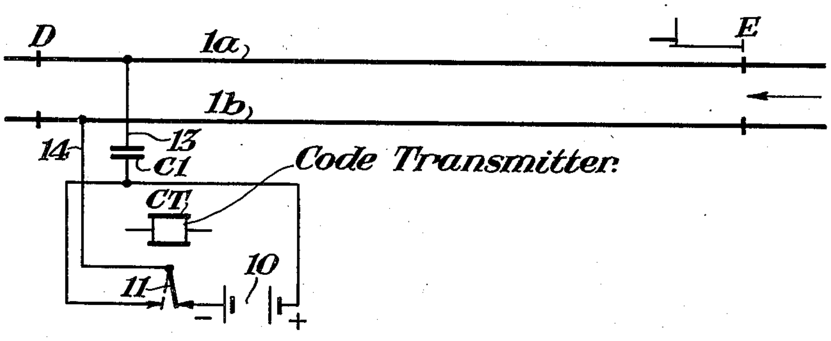
Figure 6:
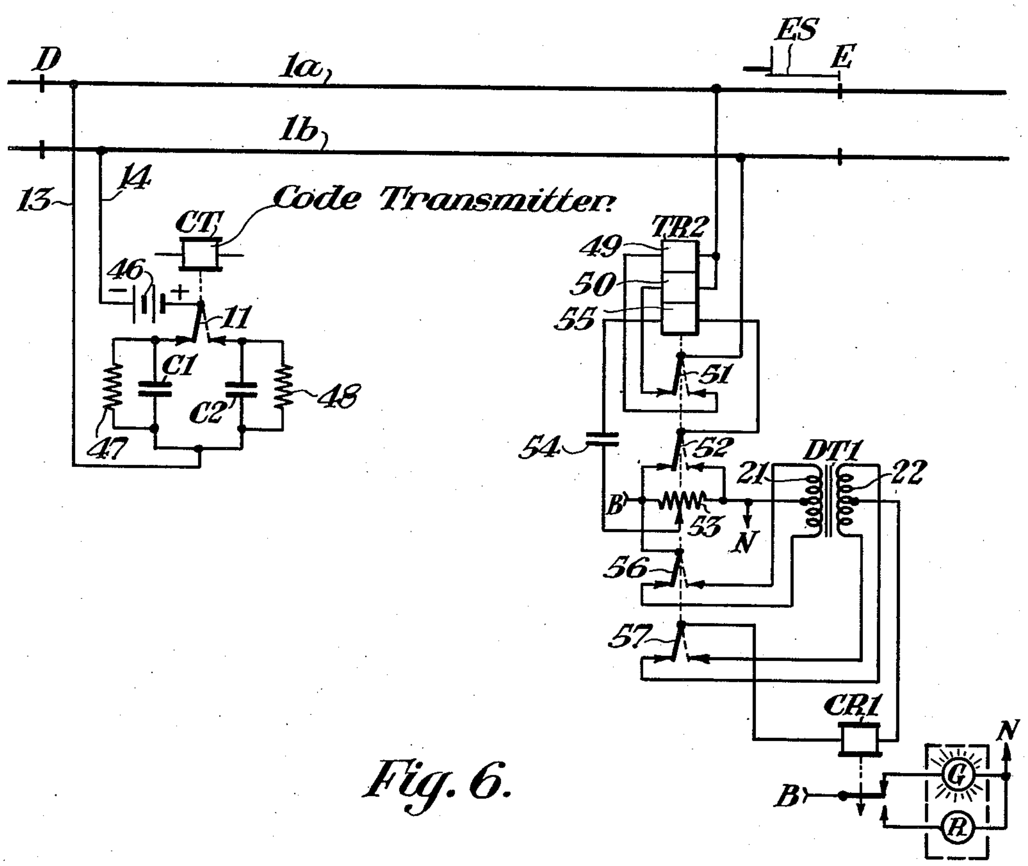
Figure 7:
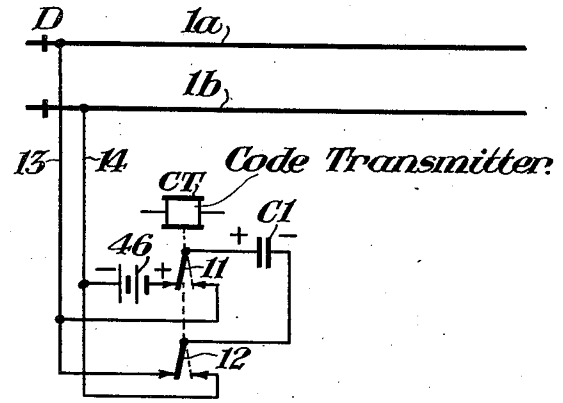
Figure 8:
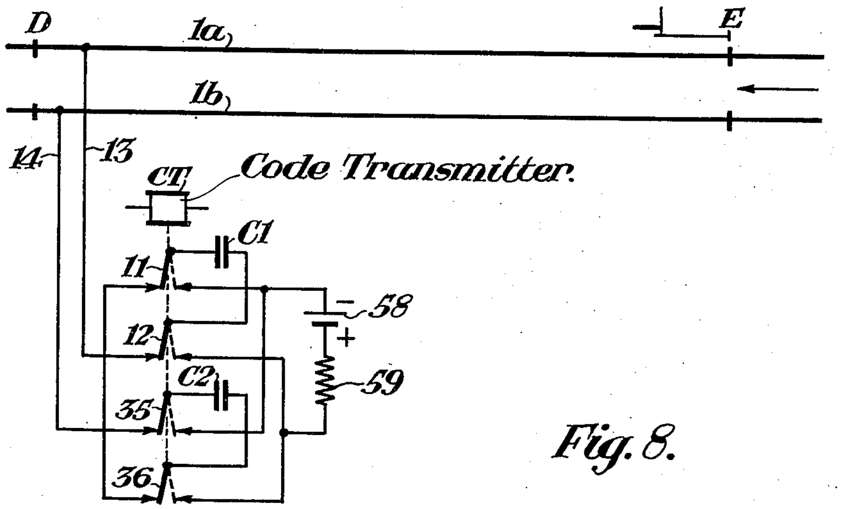
Figure 9:
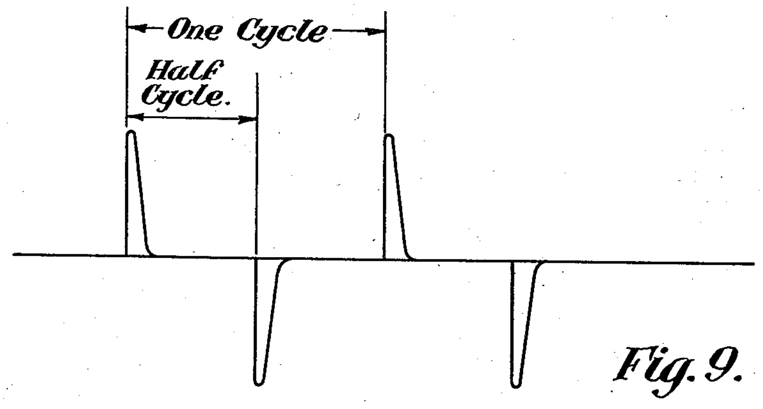
Figure 10:
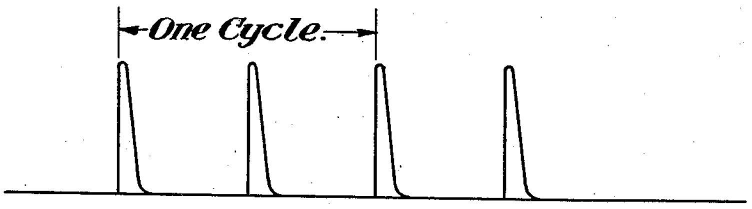

In the accompanying drawings, Fig. 1 is a diagrammatic view showing one form of apparatus embodying the invention when the supply means for the track circuit provides the track circuit with an impulse of current during the charging of a capacitor. A pair of capacitors are provided and the track circuit is supplied with current impulses of alternate polarity so that the track circuit current is characterized by a polar code as well as by a frequency code. The code responsive means for control of a wayside signal and that for control of a cab signal are responsive to the polar code as well as to the frequency code. Fig. 2 is a diagrammatic view showing another form of track circuit code impulse supply means embodying my invention and wherewith a track circuit is supplied with impulses by the recurrent discharge of a capacitor. In this form of the invention a pair of capacitors are used and a polar code as well as a frequency code provided for the track circuit. Fig. 3 is a diagrammatic view showing a modification of the supply means of Fig. 2 which may be used and which modification also embodies the invention. Fig. 4 is a diagrammatic view showing another modification of the supply means of Fig. 2 embodying the invention and wherewith a relatively high voltage current impulse for the track circuit is provided from a relatively low voltage source of supply. Fig. 5 is a diagrammatic view showing track circuit supply means wherewith track circuit current impulses of alternate polarity are provided by alternately charging and discharging a single capacitor, this apparatus also embodying the invention. Fig. 6 is a diagrammatic view showing apparatus embodying the invention when the supply means provides current impulses all of the same polarity. Also, in this form of the invention there is provided a code responsive relay means which is effectively operated by the code impulses of current of the same polarity without the so-called "contact bounce." Fig. 7 is a diagrammatic view showing a supply means for a track circuit which is a modification of the supply means of Fig. 6. Fig. 8 is a diagrammatic view showing a modification of the supply means that may be used and by which supply means current impulses of a relatively high voltage are provided from a relatively low voltage source of energy. Figs. 9 and 10 are graphs which illustrate characteristics of the current impulses supplied by the apparatus of Figs. 1 to 8, inclusive.

In each of the several views like reference characters are used to designate similar parts.

Referring to Fig. 1, the reference characters *1a* and *1b* designate the track rails of a section of railway track over which traffic normally moves in the direction indicated by the arrow placed at the right-hand end of the drawing. These rails *1a* and *1b* are formed by the usual insulated rail joints with a section D–E which may be one section of a series of sections of a signal system and which system includes a wayside signal ES located adjacent the entrance end E of the section D–E for governing traffic through the section. The signal ES may be any one of the standard forms of wayside signals and is illustrated as a color light signal having a lamp G which displays a green light when illuminated as a clear signal indication and a lamp R which displays a red light when illuminated as a stop signal indication. It will be understood that the signal ES may be provided with additional lamps disposed to display other colored lights as additional signal indications, but the display of a clear and a stop signal indication is sufficient for a full understanding of my invention. Also, a train shown conventionally at TN is illustrated as moving through the section D–E and is provided with train carried cab signal control apparatus to be described hereinafter. The track rails of the section D–E are included in a track circuit which is electrically coupled or connected to a current supply means located adjacent the exit end D of the section and to a code responsive track relay means connected to the rails adjacent the entrance end E of the section.

According to my invention, the current supply means includes a source of unidirectional current, such as a battery 10, a code transmitter or coder CT, and at least one capacitor, a pair of capacitors C1 and C2 being shown in the drawing. The battery 10 may be of any suitable voltage and preferably it is of a voltage of the order of 10 to 12 volts, the positive and negative terminals of the battery being indicated by the plus and minus signs placed on the drawing. The code transmitter CT may be any one of several known forms and it is shown as of the relay type having contact members 11 and 12 which are operated alternately to left-hand and right-hand positions at a selected code rate when its winding is supplied with current from a source not shown. The code transmitter may be continuously operated or it may be approach controlled but as shown on the drawings in the present application the code transmitter is continuously operated. As an aid to the understanding of the invention, I shall assume that the contact members 11 and 12 are operated between the two positions at a code rate of 75 times per minute, but other code rates can be used. That is to say, the code transmitter has one circuit controlling condition in which its contact members are operated to a right-hand position and a second circuit controlling condition in which its contact members are operated to a left-hand position. Capacitors C1 and C2 are of any standard construction and are preferably of relatively large capacitance.

When the contact members 11 and 12 of the code transmitter are operated to the left-hand position, that is, to the position indicated by the solid lines in the drawing, the battery 10 and capacitor C1 in series are connected to a charging circuit in which the track circuit for the section D–E is interposed, the charging circuit extending from the positive terminal of battery 10 through capacitor C1, contact 12 closed at the left-hand position, lead wire 13 to rail *1a*, the track circuit to rail *1b* and thence through lead wire 14 and contact 11 of the code transmitter to the negative terminal of battery 10. At the instant the contacts 11 and 12 are closed, a very heavy current will flow into the track circuit, but after a very short time interval the capacitor C1 accumulates a charge and the current impulse rapidly falls to substantially zero or at least to a very low value as determined by a relatively high resistance 15 connected across the capacitor C1. During the next half cycle of the code transmitter operation when the contact members 11 and 12 are operated to their right-hand position, that is, to the position illustrated by dotted lines in the drawing, the capacitor C1 is discharged through a discharge circuit which includes resistor 15 connected across the capacitor and which discharge circuit is effective only when the contact 12 is operated to the right-hand position. At this time, the battery 10 and the capacitor C2 in series are connected to a charging circuit in which the track circuit is interposed and which charging circuit extends from the positive terminal of battery 10 through capacitor C2, contact 11 closed at the right, lead wire 14 to rail 1b, the track circuit to rail 1a, lead wire 13 and contact 12 to the negative terminal of battery 10. Again, at the instant the contacts 11 and 12 are closed at the right, a heavy current flows, then after a very short interval the capacitor C2 accumulates a charge and the current impulse rapidly falls to substantially zero or at least to a very low value determined by a resistor 16 connected in multiple with capacitor C2. It is to be noted that on the next half code cycle of the code transmitter, the contacts 11 and 12 are operated back to the left-hand position and the capacitor C2 is discharged through the circuit which includes resistor 16, this discharge circuit being effective to discharge the capacitor C2 only during the half code cycle that the contacts 11 and 12 are operated to the left.

It is to be pointed out that the connections are such the charging impulse of capacitor C1 causes the rail 1a of the track circuit to be positive with respect to rail 1b and the charging impulse of current for capacitor C2 causes the rail 1b of the track circuit to be positive with respect to rail 1a. That is, the track circuit impulses are alternately positive and negative in polarity. Preferably, the capacitors C1 and C2 are alike and it follows that the current impulses supplied to the track circuit during the charging of these capacitors are of substantially the same magnitude. Hence the current impulses supplied to the track circuit by the supply means of Fig. 1 are alternate in polarity and of a selected code rate, each current impulse being of a relatively short duration as compared to the code cycle. Current impulses of this character supplied by the apparatus of Fig. 1 are illustrated by the graphs of Fig. 9.

The wayside code responsive means for the track circuit of Fig. 1 includes a code following track relay TR1, a decoding transformer DT1 and a detector or control relay CR1. The relay TR1 is preferably of the direct current polar type, the contact members 17 and 18 of this relay being operated to the left-hand or to the right-hand position according to the polarity of the current flowing in the relay winding. Also, each contact member is retained in the position to which it was last operated when the relay is deenergized, stick polar relays having this characteristic being well known to the art. The winding of relay TR1 is connected across the section rails adjacent the entrance end E of the section by lead wires 19 and 20, and hence when the section is unoccupied, that is, when the train TN does not occupy the section, the current impulses of opposite polarity supplied to the track circuit by the apparatus at the entrance end of the section in the matter described above, flow in the winding of the relay TR1 in opposite directions, with the result that relay contacts 17 and 18 are operated to the right-hand and the left-hand positions at the code rate of the current impulses. The decoding transformer DT1 is of standard construction including a primary winding 21 and a secondary winding 22, both of which windings are provided with a mid terminal as well as outside terminals. The detector or control relay CR1 is of the direct current type provided with slow release characteristics. Current from a direct current source, the positive and negative terminals of which are indicated by the reference characters B and N, respectively, is supplied to the two half portions of the primary winding 21 through contact 17 of the code following relay TR1, as will be apparent from an inspection of the drawing. This supply of current to the primary winding induces an alternating voltage in the secondary winding 22 and this alternating voltage is rectified by operation of contact member 18 and rectified current is applied to the winding of relay CR1 so that relay CR1 is energized and picked up when the relay TR1 is code operated, the relay CR1 being retained picked up from one code impulse to the next due to its slow release characteristic. It follows that when the train TN does not occupy the section D–E, the current impulses applied to the section rails at the exit end D in the manner explained flow in the winding of relay TR1 and its contact members 17 and 18 are operated to their two positions at a rate corresponding to the code rate of the impulses and the control relay CR1 is picked up. When the relay CR1 is picked up closing front contact 23, a simple circuit is completed for the lamp G and that lamp of signal ES is illuminated to cause the signal to display a green light as a clear signal indication. When the train TN occupies the section D–E as illustrated in Fig. 1, the section rails are shunted and no current is supplied to relay TR1 with the result the relay TR1 ceases to be operated and the control relay CR1 is deenergized and released at the end of its slow release period closing back contact 23 to complete a simple circuit for the lamp R of signal ES and that lamp is illuminated to display a red light as a stop indication.

The train TN is provided with cab signal control apparatus responsive to the current impulses applied to the section rails of section D–E of Fig. 1, the cab signal apparatus comprising a receiver RC, an amplifier AMP, a code following relay CFR, a decoding unit DC, a control relay CR2 and a cab signal CS.

Ths receiver RC includes two coils 24 and 25 mounted on the train ahead of the leading pair of wheels in inductive relation with the rails 1a and 1b, respectively. The coils 24 and 25 in series are connected to the input of the amplifier AMP to add their effects for current flowing in the rails in opposite directions at any given instant.

The amplifier AMP may be of any standard type, such as the well-known electron tube amplifier. The output of the amplifier is connected to winding 26 of the code following relay CFR. Since the rise and the fall of each code impulse of current supplied to the track circuit will cause a full cycle of the voltage induced in the receiver, the code following relay CR2 is made responsive only to the first half cycle of the induced voltage created by the rise of the impulse of current supplied to the track circuit, and the second half cycle of the induced voltage caused by the fall of the track circuit current impulse is made ineffective. To this end the relay CFR is a polar stick relay which is provided with an accelerating winding 27 and an opposing winding 28. The voltage for energizing the relay windings 27 and 28 is derived from a potentiometer 31 connected to the positive and negative terminals B and N of a train carried source of direct current.

The theory of operation of the relay CFR is as follows: At the instant the contact member 29 is operated to the left due to the first half cycle of induced voltage picked up by the receiver from the track rails of the section and applied to winding 26, a current impulse flows in the winding 27 due to the voltage drop across the left-hand portion of the potentiometer 31, current flowing from the left-hand terminal of potentiometer 31 through contact 29, accelerator winding 27 from right to left, capacitor 30 and to the intermediate terminal of the potentiometer 31. This energizes the winding 27 in a direction to hold the member 29 to the left. By proper choice of capacitor 30, the current flowing in the winding 27 during the charging of capacitor 30 is of sufficient magnitude and duration to prevent the relay from responding to the half cycle of the induced voltage picked up during the falling portion of the track circuit current impulse and applied to the winding 26 of the relay CFR. Simultaneously current flows from the potentiometer through contact member 29 closed to the left, winding 28 from left to right, resistor 32 and to the mid terminal of the potentiometer. This energizes winding 28 in a direction tending to open the contact member 29, that is, to move the contact member 29 away from its left-hand position. The current impulse in the accelerating winding 27 rapidly diminishes after the first rush of current due to the charging of capacitor 30 and also the current impulse supplied to the winding 26 rapidly diminishes, but the current flowing in the winding 28 continues to increase until it reaches a steady value as determined by resistor 32 and this energizing of winding 28 is effective to move contact 29 to the right. As soon as the energizing of the winding 28 moves the contact 29 away from its left-hand position, opening the contact, the capacitor 30 discharges through the windings 27 and 28 and the resistor 32 in series, and this discharge current flows in the accelerating winding 27 and in the winding 28 in a direction that aids in the energizing of the winding 28 from the potentiometer and thereby further tends to move the member 29 toward the right. At this instant the next voltage impulse of opposite polarity is picked up from the track circuit and applied to the winding 26 tending to operate the relay to the right. Hence it follows that under the influence of the three windings the contact member 29 is quickly transferred to its right-hand position. At the instant the contact member 29 is closed to the right, the voltage drop across the right-hand portion of the potentiometer 31 causes a rush of current through the capacitor 30, charging the capacitor, this current flowing in the accelerating winding 27 from left to right and in a direction which tends to cause the member 29 to be retained at the right-hand position. Also, current flows from the right-hand portion of the potentiometer 31 through the winding 28 and the resistor 32 and this current energizes the winding 28 in a direction tending to move contact member 29 away from the right-hand position. Again, the capacitor 30 is such that the charging current in the winding 27 renders the half cycle of the induced voltage impulse supplied to the winding 26 due to the falling portion of the track circuit current impulse to be ineffective. Furthermore, the current flowing in winding 28 will cause the contact member to be moved away from the right-hand position and when the contact member 29 is open the capacitor 30 discharges through the windings 27 and 28 in a direction to further tend to move the contact member 29 from its right-hand position.

By proper proportioning and adjusting of the relay CFR and its associated elements, the operation of the relay is made synchronous with the current impulses applied to the winding 26 due to the voltages picked up by the receiver RC from the track circuit current impulses. Furthermore, the relay CFR is operated to each of its two positions in a positive manner, and the so-called "contact bounce" is substantially avoided.

The contact member 33 of relay CFR is mechanically connected to the contact member 29 and is operated in step therewith.

The decoder unit DC is shown in block form since it may be of the standard form generally used in code signal equipment and its specific structure forms no part of my present invention. It is sufficient for the present application to point out that the decoding unit includes tuned circuits such that they are effectively energized in response to current impulses supplied to the input of the unit at a selected frequency or code rate and in the case here under consideration they are responsive to the code rate of 75 impulses per minute. Hence, the control relay CR2 which is connected to the output of the decoding unit DC is energized and closes its front contact 34 when the relay CFR is operated by the current impulses supplied to the track circuit of Fig. 1, the relay being made slow releasing and retained picked up from one impulse to the next. The relay CR2 in picking up, closing front contact 34, completes a simple circuit by which a lamp H of the cab signal CS is illuminated to indicate a clear or high speed signal indication. It is to be seen that if the track circuit of Fig. 1 is shunted by a train ahead of the train TN and no energy is picked up by the receiver RC, the control relay CR2 becomes deenergized and released closing back contact 34 and completing a simple circuit for a lamp L of the cab signal and that lamp is illuminated to display a danger or low speed signal indication.

In Fig. 2, the track rails 1a and 1b of the railway track are formed with an insulated track section D–E the same as in Fig. 1, and which section rails are included in a track circuit. In this form of the invention the track circuit is directly coupled to the discharge circuits of a pair of capacitors of the current supply means and the track circuit is energized by the discharge impulses of the capacitors. The current supply means includes a battery 10, a code transmitter CT and a pair of capacitors C1 and C2. The code transmitter CT is provided with contact members 11, 12, 35 and 36 which are operated to the left and to the right at the selected code rate. When the code transmitter is operated to the left a circuit is completed by which capacitor C1 is charged, the circuit extending from the positive terminal of battery 10 through resistor 37, capacitor C1 and contact 12 closed to the left to the negative terminal of the battery, the capacitor being charged with its left-hand terminal the positive terminal. At this time the capacitor C2 is connected to the section rails by a connection which extends from the left-hand terminal of the capacitor through contact 36 closed to the left, lead wire 13, rail 1a and the track circuit to rail 1b, lead wire 14 and contact 11 closed to the left to the right-hand terminal of the capacitor C2. It follows that a charge built up on capacitor C2 in a manner to appear shortly will be discharged and the track circuit supplied with a corresponding current impulse due to the track circuit being included in the discharge circuit of the capacitor C2. On the next half code cycle of the code transmitter, the capacitor C2 is connected to a charging circuit which includes the positive terminal of battery 10, resistor 37, capacitor C2, contact 12 closed to the right, and the negative terminal of the battery, and the capacitor is charged with its right-hand terminal the positive terminal. At this time the capacitor C1 is connected to a discharge circuit in which the track circuit is interposed and which discharge circuit extends from the positive left-hand terminal of the capacitor C1 through contact 11 closed to the right, wire 40, lead wire 13 to rail 1a, track circuit to rail 1b lead wire 14 and contact 35 closed to the right to the capacitor C1. Thus, the capacitor C1 is at this time discharged and the track circuit is supplied with a current impulse due to the fact that it is interposed in the discharge circuit of the capacitor. On the next half code cycle of the code transmitter, the capacitor C1 is connected to its charging circuit as explained above and the capacitor C2 is connected to its discharging circuit including the track circuit. It is to be noted that the discharge impulse of capacitor C1 causes the rail 1a to be positive and the discharge of capacitor C2 causes the rail 1b to be positive. It is clear therefore, that the current impulses supplied by the apparatus of Fig. 2 to the track circuit are of alternate polarity and of a code rate determined by the code transmitter, and these current impulses supplied to the track circuit have the same characteristic as the current impulses supplied by the apparatus of Fig. 1. Hence the track circuit apparatus of Fig. 2 will be effective to operate the train carried cab signal control apparatus of the train TN of Fig. 1 and also effective to operate the wayside signal control apparatus of Fig. 1 when the section is unoccupied.

In Fig. 3 there is disclosed a modification of the supply means of Fig. 2 in which a battery 41 having a mid terminal 42 is provided and the track circuit for the section D–E is interposed in the discharge circuits of the capacitors C1 and C2. Looking at Fig. 3, when the code transmitter is operated to the left closing the lefthand contacts 11 and 12, the capacitor C1 is connected to the right-hand portion of battery 41 through contact 12 and resistor 43 and the capacitor C1 is charged, the righthand terminal of the capacitor being the positive terminal. At this time the capacitor C2 is connected to a discharge circuit that includes the track circuit, the discharge circuit extending from the right-hand terminal of capacitor C2 through lead wire 14 to rail 1b, the track circuit to rail 1a, lead wire 13 and contact 11 closed to the left to the other terminal of the capacitor C2. When the code transmitter is operated to the right-hand position, the capacitor C2 is connected to the left-hand portion of battery 41 through resistor 43 and contact 11 and the capacitor C2 is charged, its right-hand terminal being the positive terminal. At this time the capacitor C1 is connected to a discharge circuit in which the track circuit for the section D–E is interposed, the discharge circuit extending from the positive right-hand terminal of capacitor C1 through contact 12 closed to the right, lead wire 13, rail 1a and the track circuit to rail 1b and lead wire 14 to the negative terminal of the capacitor C1. It follows that the apparatus of Fig. 3 is effective to provide the track circuit with current impulses alternately positive and negative in polarity and of a code rate governed by the code transmitter and these code impulses supplied to the track circuit have the characteristics disclosed by the graphs of Fig. 9 and are effective to operate the wayside and train carried signal equipments shown in Fig. 1.

In Fig. 4 there is shown another modification of the supply means of Fig. 2 and by which modification current impulses of a relatively high voltage are supplied to the track circuit from a single cell battery as the power source. Referring to Fig. 4, a battery 44 of a single cell is connected to a vibrator 45 shown in block form. This vibrator 45 may be of any one of the known forms of vibrators used to convert direct current of one voltage to direct current of a different voltage. As here shown, the vibrator 45 includes means by which the 2 volt current of battery 44 is converted into direct current of a voltage of the order of, say, 10 to 12 volts. The output of the vibrator 45, the positive and negative terminals of which are indicated by the plus and minus signs on the drawing, is connected to the capacitors C1 and C2 to alternately charge the capacitors according to the position of the contact members 11 and 12 of the coder CT. The capacitors C1 and C2 are in turn alternately connected to discharge circuits in which the track circuit is interposed, these discharge circuits being the same as shown in Fig. 2 and the description need not be repeated. It follows that in Fig. 4, the supply means is effective to supply current impulses to the track circuit which are alternate in polarity and of a code rate determined by the code transmitter and these current impulses supplied to the track circuit are available for effectively operating the wayside signal control apparatus and the train carried cab signal apparatus disclosed in Fig. 1.

In Fig. 5, the supply means associated with the track circuit of section D–E includes a single capacitor C1, a battery 10, and a code transmitter CT. When the contact 11 of the code transmitter is closed to the right, the battery 10 and capacitor C1 in series are connected to a charging circuit in which the track circuit for the section is interposed and which charging circuit can be traced from the positive terminal of battery 10, through capacitor C1, lead wire 13 to rail 1a, the track circuit to rail 1b, lead wire 14, and contact 11 closed to the right to the negative terminal of he battery 10. Thus, it is to be seen that the capacitor C1 is charged, the lower terminal as viewed in Fig. 5 being the positive terminal. Then when the contact 11 of the code transmitter is closed to the left, the battery 10 is disconnected and the capacitor C1 is connected to a discharge circuit in which the track circuit for the section is interposed and which discharge circuit will be readily understood by an inspection of Fig. 5. It follows that with the apparatus of Fig. 5, a current impulse is supplied to the track circuit when the capacitor C1 is charged and another current impulse is supplied to the track circuit on the discharge of the capacitor and the current impulses thus supplied to the track circuit are alternate in polarity and of a code rate determined by the code rate of the transmitter. Hence, the current impulses supplied by the apparatus of Fig. 5 are effective to operate both the wayside and the train carried signal control apparatus of Fig. 1.

In Fig. 6 there is disclosed a form of apparatus embodying the invention, wherewith current impulses are supplied to the track circuit for the section D–E during the charging of the capacitors C1 and C2 and the connection is such that the track circuit impulses are all of the same polarity. Looking at Fig. 6, a battery 46 and a capacitor C1 in series are connected across the section rails during the half cycle of the code transmitter CT that the contact 11 is operated to the left, the connection to the rails being completed through the lead wires 13 and 14. That is to say, when the coding contact 11 is closed to the left a current impulse flows from battery 46 to the capacitor C1 to charge the capacitor and this current impulse flows in the track circuit due to the track circuit being interposed in the charging circuit. When the code transmitter is operating to the right, the capacitor C1 is disconnected from its charging circuit and is provided with a discharge circuit that includes a resistor 47 connected across the capacitor. At this time, the battery 46 and the capacitor C2 in series are connected across the section rails through contact 11 and the capacitor C2 is charged, the charging impulse flowing in the track circuit due to the track circuit being interposed in the charging circuit of the capacitor. Then when the code transmitter is operated back to the left to charge the capacitor C1 in the manner described above, the capacitor C2 is provided with a discharge circuit that includes resistor 48 connected across the capacitor and which discharge circuit is effective only when the code transmitter is operated to the left. It follows that current impulses are supplied to the track circuit in step with the alternate charging of the capacitors C1 and C2 and the track circuit current impulses are all of the same polarity and of a code rate determined by the code transmitter CT. In Fig. 10 there are shown graphs illustrating the current impulses supplied to the track circuit by the apparatus of Fig. 6.

When the track circuit current impulses are all of one polarity the track relay means responsive to the code impulses is modified to include a three winding stick polar code following relay TR2, the relay TR2 having operating windings 49 and 50 which are connected across the track rails alternately through contact 51 of the relay, and a third winding 55. Assuming a code current impulse is supplied to the track circuit when the track section is unoccupied, and the contact member 51 at its left-hand position, that is, in the position indicated by the solid line in the drawing, the current impulse flows in winding 50. The connection for the winding 50 is such that when the current impulse flows in the winding it energizes the relay at a polarity as required to operate the contact members of the relay to the right-hand position. The relay TR2 is further characterized in that when the relay is energized at a polarity causing its contact member to be operated from the last position, the contact member once started is moved to the reverse position even though the energizing impulse supplied to the relay that started the operation ceases, such polar relays being well known to the art. It is to be noted that during the time the relay TR2 occupied its left-hand position a capacitor 54 was charged by the voltage across the left-hand portion of a potentiometer 53 which is connected across the source having terminals B and N, the charging current flowing in winding 55 from right to left as viewed in the drawing. Hence, when the relay is operated to the right due to the track circuit current impulse flowing in winding 50, the capacitor 54 discharges through the winding 55, the contact 52 closed to the right and the right-hand portion of the potentiometer resistor 53. The capacitor 54 is immediately recharged due to the voltage of the right-hand portion of the potentiometer 53, the lower terminal of the capacitor 54 being this time the positive terminal. The winding 55 is poled in its connection so that this discharging and charging current of capacitor 54 at this time flows in the winding 55 in a direction that energizes the relay at a polarity that tends to hold the relay at the right-hand position. When the next track circuit impulse is received at the entrance end of the section, it flows in the winding 49 and contact 51 closed to the right, and the connection of winding 49 is such that the relay is energized at a polarity tending to operate the relay back to the left-hand position. When the contact 52 is closed to the left the capacitor 54 discharges through the left-hand portion of the resistor 53, contact 52 and winding 55 from right to left. The capacitor 54 is immediately recharged due to the voltage drop across the left-hand portion of the potentiometer 53. The current flowing in winding 55 at this time is of a polarity which tends to operate the relay to the left-hand position. It follows from the foregoing that the relay TR2 is operated in step with the successive track circuit current impulses of short duration and all of the same polarity, and in a manner such that "contact bounce" is substantially avoided. With the relay TR2 thus operated, current from the source B–N is alternately supplied to the primary winding 21 of decoding transformer DT1 and contact member 56 of the relay TR2, with the result that an alternating voltage is induced in secondary winding 22 of the transformer, and this alternating voltage is rectified by contact 57 of relay TR2 and applied to the control relay CR1 the relay being energized and picked up to close front contact 34 and complete the signal circuit for the lamp G of the signal ES the same as described in connection with Fig. 1.

In Fig. 7 there is disclosed a modification for the supply means of Fig. 6 and by which modification the track circuit is alternately included in a charging and discharging circuit of capacitor C1 in such a manner that the track circuit is supplied with current impulses all of the same polarity and of a code rate determined by the code transmitter. Looking at Fig. 7, when the contacts 11 and 12 of the code transmitter are closed to the left a charging circuit is completed from the positive terminal of battery 46 through contact 11, capacitor C1, contact 12, lead wire 13, rail 1*a* and the track circuit to rail 1*b* and lead wire 14 to the negative terminal of the battery. When the contact members 11 and 12 are operated to the right, the capacitor C1 is connected to a discharge circuit that includes the track circuit, the discharge circuit extending from the positive terminal of capacitor C1 through contact 11, lead wire 13, rail 1*a* and the track circuit to rail 1*b*, lead wire 14 and contact 12 to the negative terminal of the capacitor C1.

It is clear that the current impulses thus supplied to the track circuit by the apparatus of Fig. 7 are all of the same polarity and are effective to operate the code responsive relay TR2 of Fig. 6 and its associated apparatus the same as the track circuit current impulses supplied thereto by the apparatus of Fig. 6.

In Fig. 8 there is disclosed supply means which provide current impulses of a single polarity for the track circuit and which impulses are of a relatively high peak voltage although the power source is a low voltage single cell battery, the track circuit being interposed in the discharge circuit of the capacitors. Looking at Fig. 8, and assuming that the code transmitter has operated its contacts to the right, that is, to the position indicated by the dotted lines the capacitor C1 is charged from battery 58 through resistor 59, contact 12 closed to the right, capacitor C1 and contact 11 closed to the right to the negative terminal of the battery. Also, capacitor C2 is charged by current flowing from the positive terminal of battery 58 through resistor 59, contact 36 closed to the right, capacitor C2, and contact 35 closed to the right to the negative terminal of the battery. That is to say, the two capacitors C1 and C2 are charged in multiple during the half code cycle of the code transmitter operated to the right. When the code transmitter is operated to the left, the two capacitors C1 and C2 in series are connected to a discharge circuit that includes the track circuit of the section, and the current impulse supplied to the track circuit has a peak voltage substantially equal to the sum of the voltages of the two charged capacitors. This discharge circuit can be traced from the positive terminal of capacitor C1 through contact 12 closed to the left, lead wire 13, rail 1a and track circuit to rail 1b, lead wire 14, contact 35 closed to the left, capacitor C2 from its negative to its positive terminal, contact 36 closed to the left, and contact 11 closed to the left of the negative terminal of capacitor C1. It is clear that the current impulses supplied to the track circuit by the apparatus of Fig. 8 are all of the same polarity and would be effective to operate the wayside code responsive relay TR2 and its associated apparatus of Fig. 6. It is to be noted, however, that in Fig. 8 only one track circuit current impulse is supplied each code cycle of the code transmitter and hence the code impulses supplied to the control relay CR1 would be only one-half of the code rate of the apparatus of Fig. 6 and the relay CR1 would be provided with a slow release period which would assure that the relay would be held up from one code impulse to the next. It is also apparent that with the apparatus of Fig. 8, the voltage of the track circuit current impulse can be made higher by using more capacitors.

Although I have herein shown and described certain forms of impulse code track circuit apparatus for wayside and cab signal control embodying my invention, it is to be understood that various changes and modifications may be made therein within the scope of the appended claims without departing from the spirit and scope of my invention.

Having thus described my invention, what I claim is:

1. In combination with a track circuit including the track rails of a section of railway track, a source of unidirectional current, a capacitor, a code transmitter operable to a first and a second circuit controlling condition alternately at a selected code rate, a charging circuit means including said source and said first circuit controlling condition of said code transmitter connected to said capacitor to supply a charging current impulse to the capacitor, a discharging circuit means having connections to said capacitors and including said second circuit controlling condition of said code transmitter to cause a discharging current impulse from the capacitor, and at least a selected one of said charging and discharging circuit means electrically coupled to said track circuit to supply the track circuit with current impulses at a code rate determined by said selected code rate due to the alternate charging and discharging of said capacitor.

2. In railway track circuit apparatus the combination comprising, a source of unidirectional current, a capacitor, a code transmitter having a first and a second circuit controlling condition, said code transmitter being alternately operated to its first and second circuit controlling conditions at a selected code rate, a charging circuit means including said source and said first circuit controlling condition of the code transmitter connected to said capacitor to supply a charging current impulse to said capacitor, a discharging circuit means including said second circuit controlling condition of said code transmitter having connection to said capacitor to cause a discharging current impulse from the capacitor. and a pair of circuit lead wires electrically connected to at least a selected one of said charging and discharging circuit means to receive current impulses of a code rate determined by said selected code rate due to the alternate charging and discharging of said capacitor.

3. In combination with a track circuit including the track rails of a section of railway track, a source of unidirectional current, a capacitor, a code transmitter operable to a first and a second circuit controlling condition alternately at a selected code date, said transmitter being normally active, a charging circuit means including said source and said first circuit controlling condition of said code transmitter connected to said capacitor to supply a charging current impulse to the capacitor, a discharging circuit means having connections to said capacitor and including said second circuit controlling condition of said code transmitter to cause a discharging current impulse from the capacitor, and said track circuit interposed in at least a selected one of said charging and discharging circuit means to receive current impulses of a code rate determined by said selected code rate due to the alternate charging and discharging of said capacitor.

4. In combination with a track circuit including the track rails of a section of railway track, a source of unidirectional current, a capacitor, a code transmitter having contacts operable to a first and a second position, said code transmitter being active to operate its contacts to said first and second positions alternately at a selected code rate, a charging circuit including said source having connections to said capacitor to charge the capacitor, a selected one of said code transmitter contacts being connected to said charging circuit and rendering the charging circuit effective only when that contact is operated to its first position, a discharging circuit having connections to said capacitor for discharging the capacitor, a selected contact of said code transmitter being connected to said discharging circuit and rendering the discharging circuit effective only when that contact is operated to its second position, and said track circuit interposed in at least a selected one of said charging and discharging circuits to receive recurrent current impulses due to the alternating charging and discharging of said capacitor.

5. In combination with a track circuit including the track rails of a section of railway track, a source of unidirectional current, a capacitor, a code transmitter having contacts operable to a first and a second position, said code transmitter being active to operate its contacts to said first and second positions alternately at a selected code rate, a charging circuit having connections across said capacitor and including said source for charging the capacitor, a selected one of said code transmitter contacts having connection to said charging circuit for the circuit to be effective to charge the capacitor only when said code transmitter is operated to its first position, a discharging circuit having connections across said capacitor for discharging the capacitor, a selected contact of said code transmitter having connection to said discharging circuit for the circuit to be effective to discharge the capacitor only when the code transmitter is operated to its second position, and said track circuit interposed in at least a selected one of said charging and discharging circuits for the track circuit to be supplied with current impulses at a code rate determined by said selected code rate of the code transmitter due to the alternate charging and discharging of said capacitor.

6. In combination with a track circuit including the track rails of a section of railway track, a source of unidirectional current, a capacitor, a code transmitter having contacts operable to a first and a second position, said code transmitter being active to operate its contacts to said first and second positions alternately at a selected code rate, a charging circuit means including said source and a selected one of said contacts of said code transmitter connected to said capacitor to supply a charging current impulse to the capacitor, said charging circuit means being effective only when said code transmitter is operated to its first position, a discharging circuit means including a selected contact of said code transmitter connected to said capacitor to receive a discharging current impulse from the capacitor, said discharging circuit means being effective only when said code transmitter is operated to its second position, and said track circuit having connections to at least a selected one of said charging and discharging circuits to receive current impulses of a code rate due to the alternate charging and discharging of said capacitor.

7. In combination with a track circuit including the track rails of a section of railway track, a source of unidirectional current, a first and a second capacitor, a code transmitter having contacts operable to a first and a second position, said code transmitter being active to operate its contacts to said first and second position alternately at a selected code rate, a charging and a discharging circuit for each of said first and second capacitors, said charging circuits being connected to said source over a first and a second position contact respectively of said code transmitter to alternately charge said capacitors at said code rate, said discharging circuit being connected to a first and a second position contact respectively of said code transmitter to alternately discharge said capacitors at said code rate, said first capacitor being discharged when said second capacitor is being charged and vice versa, and said track circuit having connections either to the two charging circuits or to the two discharging circuits to receive current impulses at a code rate determined by said code rate of operation of said code transmitter.

8. In combination with a track circuit including the track rails of a section of railway track, a source of unidirectional current, a first and a second capacitor, a code transmitter having contacts operable to a first and a second position, said code transmitter being active to operate its contacts to said first and second positions alternately at a selected code rate, a charging and a discharging circuit for each of said first and second capacitors, said charging circuits being connected to said source over a first and a second position contact respectively of said code transmitter to alternately charge said capacitors at said code rate, said discharging circuits being connected to a first and a second position contact respectively of said code transmitter to alternately discharge said capacitors at said code rate, said first capacitor being discharged when said second capacitor is being charged and vice versa, and circuit means connected to said capacitors and to said track circuit to include said track circuit as a common element of the two charging circuits or as a common element of the two discharging circuits whereby the track circuit is supplied with current impulses having a code rate determined by the code rate of operation of said code transmitter.

9. In combination with a track circuit including the track rails of a section of railway track, a source of unidirectional current, a first and a second capacitor, a code transmitter having contacts operable to a first and a second position, said code transmitter being active to operate its contacts to said first and second positions alternately at a selected code rate, a charging and a discharging circuit for each of said first and second capacitors, said charging circuits being connected to said source over a first and a second position contact respectively of said code transmitter to alternately charge said capacitors at said code rate, said discharging circuits being connected to a first and a second position contact respectively of said code transmitter to alternately discharge said capacitors at said code rate, said first capacitor being discharged when said second capacitor is being charged and vice versa, said track circuit having connection to at least the two charging circuits or to the two discharging circuits whereby the track circuit is supplied with current impulses having a code rate determined by said selected code rate of the code transmitter, and said charging and discharging circuits of said capacitors being poled for the current impulses supplied to the track circuit to be alternate in polarity.

10. In combination with a track circuit including the track rails of a section of railway track, a source of unidirectional current, a first and a second capacitor, a code transmitter having contacts operable to a first and a second position, said code transmitter being active to operate its contacts to said first and second position alternately at a selected code rate, a charging and a discharging circuit for each of said first and second capacitors, said charging circuits being connected to said source over a first and a second position contact respectively of said code transmitter to alternately charge said capacitors at said code rate, said charging circuits poled for the charge of each capacitor to have a selected polarity, a first and a second discharging circuit including a first and a second position contact respectively of said code transmitter to connect said first and second capacitors respectively to said track circuit to supply the track circuit with current impulses having a code rate determined by the code rate of said code transmitter due to the recurrent discharging of said capacitors, and said discharging circuits being poled for the current impulses supplied to the track circuit to be of alternate polarity.

11. In combination with a track circuit including the track rails of a section of railway track, a source of unidirectional current, a first and a second capacitor, a code transmitter having contacts operable to a first and a second position, said code transmitter being active to operate its contacts to said first and second positions alternately at a selected code rate, a first and a second charging circuit for said first and second capacitors respectively; said first charging circuit including said source, said first capacitor, a first position contact of said code transmitter and said track circuit in series; said second charging circuit including said source, said second capacitor, a second position contact of said code transmitter and said track circuit in series; and a first and a second resistor connected across said first and second capacitors respectively to discharge the capacitors.

12. In combination with a track circuit including the track rails of a section of railway track, a source of unidirectional current, a first and a second capacitor, a code transmitter having contacts operable to a first and a second position, said code transmitter being active to operate its contacts to said first and second positions alternately at a selected code rate; a first charging circuit including said source, said first capacitor and a first position contact of said code transmitter; a second charging circuit including said source, said second capacitor and a second position contact of said code transmitter; said first and second charging circuits poled for each said capacitor to be charged at a selected polarity, a first discharging circuit including a second position contact of said code transmitter to connect said first capacitor across said track circuit, a second discharging circuit including a first position contact of said code transmitter to connect said second capacitor across said track circuit, and said discharging circuits poled for the discharge current impulses thus caused to flow in the track circuit to be of alternating polarity.

13. In combination with a track circuit including the track rails of a section of railway track, a source of unidirectional current, a capacitor, a code transmitter having contacts operable to a first and a second position, said code transmitter being active to operate its contacts to said first and second positions alternately at a selected code rate; a charging circuit including said source, a first position contact of said code transmitter, said track circuit and said capacitor in series; and a discharging circuit including said capacitor, a second position contact of said code transmitter and said track circuit in series; whereby current impulses alternate in polarity and of a code rate determined by said selected code rate are supplied to the track circuit.

14. In combination with a track circuit including the track rails of a section of railway track, a source of unidirectional current, a capacitor, a code transmitter having contacts operable to a first and a second position, said code transmitter being active to operate its contacts to said first and second positions alternately at a selected code rate; a charging circuit including said source, a first position contact of said code transmitter, said track circuit and said capacitor in series to energize the track circuit by each charging impulse of the capacitor; and a discharging circuit including said capacitor, a second position contact of said code transmitter and said track circuit to energize the track circuit by each discharging impulse of the capacitor whereby the track circuit is supplied with current impulses of a code rate determined by said selected code rate of the code transmitter.

15. In combination with a track circuit including the track rails of a section of railway track, a source of unidirectional current of a given voltage, a first and a second capacitor, a code transmitter having contacts operable to a first and a second position, said code transmitter being active to operate its contacts to said first and second positions alternately at a selected code rate, means including a first position contact of said code transmitter to connect said first and second capacitors in multiple to said source to charge each said capacitor at substantially said given voltage; and a discharging circuit including a second position contact of said code transmitter, said capacitors in series and said track circuit to supply to the track circuit a current impulse having a peak voltage substantially twice said given voltage.

16. In combination with a track circuit including the track rails of a section of railway track, a source of unidirectional current of a given voltage, a selected number of capacitors, a code transmitter having contacts operable to a first and a second position, said code transmitter being active to operate its contacts to said first and second position alternately at a selected code rate, charging circuit means including first position contacts of said code transmitter to connect said capacitors in multiple across said source to charge each capacitor to substantially said given voltage, and discharging circuit means including second position contacts of said code transmitter, said selected number of capacitors in series and said track circuit to supply to the track circuit current impulses having a peak voltage determined by said selected number of capacitors.

17. In combination with a track circuit including the track rails of a section of railway track, a single cell battery, voltage converter means connected to said battery and including means to convert the voltage of the battery to a relatively high direct voltage, a capacitor, a code transmitter having contacts operable to a first and a second position, said code transmitter being active to operate its contacts to said first and second positions alternately at a selected code rate, means including a first position contact of said code transmitter to connect said capacitor to said voltage converter means to charge said capacitor at said relatively high voltage, means including a second position contact of said code transmitter to connect said capacitor to said track circuit to supply the track circuit with current impulses having a peak voltage substantially equal to said relatively high voltage and a code rate determined by said selected code rate of the code transmitter.

18. In combination with a track circuit including the track rails of a section of railway track, a source of unidirectional current, a current storing reactance device, a code transmitter having a first and a second circuit controlling position, said code transmitter being operable to its first and second positions alternately at a selected code rate; circuit means including said source, said reactance device and said code transmitter connected to said track circuit to supply to the track circuit current impulses at a code rate determined by said selected code rate, a train carried receiver mounted for inductive relation to said track rails to pick up a voltage impulse in response to each said current impulse supplied to the track circuit, said voltage impulses having positive and negative half cycles due to the rising and falling of said current impulse, a code responsive relay having a winding connected to said receiver to energize the relay by said voltage impulse; and means including a capacitor, a source of direct voltage and a contact of the relay connected to another winding of said relay to energize the relay in opposition to the energizing of the relay by the half cycle of the voltage impulse picked up by said receiver due to the falling of the current impulse supplied to the track circuit.

19. In combination with a track circuit including the track rails of a section of railway track, a source of unidirectional current, a capacitor, a code transmitter having contacts operable to a first and a second position, said code transmitter being active to operate its contacts to said first and second positions alternately at a selected code rate; a charging circuit including said source, the first position of a first and second contact of said code transmitter, said capacitor and said track circuit in series to charge the capacitor with a current impulse which flows in the track circuit; a discharging circuit including said capacitor, the second position of said first and second contacts and said track circuit in series to cause a discharging current impulse from said capacitor to flow in said track circuit; and said charging and discharging circuits poled for said charging and discharging current impulses to flow in the track circuit in the same direction.

References Cited in the file of this patent

UNITED STATES PATENTS

| Number | Name | Date |
|---|---|---|
| 2,197,415 | Place | Apr. 16, 1940 |